United States Patent
Moriya et al.

(10) Patent No.: US 10,114,936 B2
(45) Date of Patent: Oct. 30, 2018

(54) INFORMATION PROCESSING DEVICE, AUTHENTICATION SYSTEM, AUTHENTICATION METHOD, AND PROGRAM

(71) Applicant: NEC Corporation, Minato-ku, Tokyo (JP)

(72) Inventors: Atsushi Moriya, Tokyo (JP); Kazuhide Umeda, Tokyo (JP)

(73) Assignees: NEC CORPORATION, Tokyo (JP); NEC SOLUTION INNOVATORS, LTD., Tokyo (JP)

( * ) Notice: Subject to any disclaimer, the term of this patent is extended or adjusted under 35 U.S.C. 154(b) by 0 days.

(21) Appl. No.: 14/908,192

(22) PCT Filed: Jul. 30, 2014

(86) PCT No.: PCT/JP2014/070061
§ 371 (c)(1),
(2) Date: Jan. 28, 2016

(87) PCT Pub. No.: WO2015/016262
PCT Pub. Date: Feb. 5, 2015

(65) Prior Publication Data
US 2016/0188858 A1   Jun. 30, 2016

(30) Foreign Application Priority Data
Jul. 30, 2013 (JP) .................................. 2013-157417

(51) Int. Cl.
*G06F 21/00* (2013.01)
*G06F 21/32* (2013.01)
(Continued)

(52) U.S. Cl.
CPC ............ *G06F 21/32* (2013.01); *G06F 21/316* (2013.01); *G06K 9/00892* (2013.01); *G06F 2221/2111* (2013.01)

(58) Field of Classification Search
CPC ................... G06F 21/32; G06F 21/316; G06F 2221/2111; G06K 9/00288; G06K 9/00892
See application file for complete search history.

(56) References Cited

U.S. PATENT DOCUMENTS 8,225,380 B2 *  7/2012  Moshir ................... G06F 21/35
                                                        726/4
9,721,086 B2 *  8/2017  Shear ...................... H04L 63/20
(Continued)

FOREIGN PATENT DOCUMENTS

JP    2006-018677 A    1/2006
JP    2007-249585 A    9/2007
(Continued)

OTHER PUBLICATIONS

Snelick, Robert, et al. "Large-scale evaluation of multimodal biometric authentication using state-of-the-art systems." IEEE transactions on pattern analysis and machine intelligence 27.3 (2005): 450-455.*

(Continued)

*Primary Examiner* — Don G Zhao

(57) ABSTRACT

An information processing device includes a first acquisition unit that acquires first biological data, a collation unit that refers to a collation data storage unit that stores a plurality of pieces of second biological data, and collates the first biological data with each piece of the second biological data, a second acquisition unit that acquires attribute information for each piece of the second biological data from an attribute information storage unit that stores attribute information associated with each piece of the second biological data, and a specification unit that compares the attribute information (Continued)

acquired together with the first biological data with the attribute information associated with each piece of the second biological data, and specifies at least one of the pieces of second biological data corresponding to the first biological data, on the basis of a result of the comparison and a result of the collation.

18 Claims, 14 Drawing Sheets

(51) Int. Cl.
    *G06K 9/00*           (2006.01)
    *G06F 21/31*         (2013.01)

(56) References Cited

U.S. PATENT DOCUMENTS

| | | | |
|---|---|---|---|
| 2003/0120934 A1* | 6/2003 | Ortiz | H04L 63/0861 713/186 |
| 2006/0013448 A1 | 1/2006 | Itoh et al. | |
| 2008/0120698 A1* | 5/2008 | Ramia | H04L 63/08 726/4 |
| 2008/0123907 A1 | 5/2008 | Eura et al. | |
| 2008/0133930 A1* | 6/2008 | Moshir | G06F 21/35 713/183 |
| 2009/0074261 A1 | 3/2009 | Haupt et al. | |
| 2009/0089833 A1* | 4/2009 | Saito | H04H 60/33 725/38 |
| 2009/0175512 A1 | 7/2009 | Hyuga et al. | |
| 2009/0226053 A1* | 9/2009 | Matsuda | G06K 9/00885 382/125 |
| 2012/0076367 A1 | 3/2012 | Tseng | |
| 2012/0237092 A1* | 9/2012 | Bechtel | G06K 9/00013 382/126 |
| 2013/0063581 A1 | 3/2013 | Komatsu et al. | |
| 2014/0101434 A1* | 4/2014 | Senthurpandi | G06F 12/1408 713/150 |
| 2014/0101453 A1* | 4/2014 | Senthurpandi | H04L 63/0861 713/172 |
| 2014/0237579 A1* | 8/2014 | Ikonomov | H04L 9/3226 726/8 |
| 2014/0281580 A1* | 9/2014 | Enomoto | G06F 17/30386 713/189 |

FOREIGN PATENT DOCUMENTS

| | | |
|---|---|---|
| JP | 2008-129830 A | 6/2008 |
| JP | 2009-259269 A | 11/2009 |
| JP | 2012-133565 A | 7/2012 |
| JP | 2013-061875 A | 4/2013 |

OTHER PUBLICATIONS

Wayman, James, et al. An introduction to biometric authentication systems. Springer London, 2005.*
Japanese Office Action for JP Application No. 2015-529594 dated Nov. 22, 2016 with English Translation.
International Search Report for PCT Application No. PCT/JP2014/070061, dated Oct. 28, 2014.
Extended European Search Report for EP Application No. EP14832911.3 dated Feb. 3, 2017.

* cited by examiner

INFORMATION PROCESSING DEVICE, AUTHENTICATION SYSTEM, AUTHENTICATION METHOD, AND PROGRAM

This application is a National Stage Entry of PCT/JP2014/070061 filed on Jul. 30, 2014, which claims priority from Japanese Patent Application 2013-157417 filed on Jul. 30, 2013, the contents of all of which are incorporated herein by reference, in their entirety.

TECHNICAL FIELD

The present invention relates to an information processing device, an authentication system, an authentication method, and a program.

BACKGROUND ART

In recent years, systems that use personal authentication techniques using biological information have been in widespread use. As an example of such personal authentication techniques, there is a face authentication technique for authenticating an individual on the basis of, for example, a person's face image.

Patent Document 1 discloses a cellular phone that calculates the degree of suitability by collating a face image of a person to be authenticated which is acquired through an imaging unit with face feature information included in a storage unit, compares the calculated degree of suitability with a threshold determined on the basis of position information acquired by a position information acquisition unit, and determines the success or failure of face authentication.

RELATED DOCUMENT

Patent Document

[Patent Document 1] Japanese Unexamined Patent Publication No. 2007-249585

SUMMARY OF THE INVENTION

However, there are some problems in a personal authentication technique using biological information. For example, in the face authentication technique as described above, there are a plurality of pieces of collation face image data having features similar to that of face image data to be collated, and the plurality of pieces of collation face image data show a degree of suitability similar to that of the face image data to be collated, in some cases. In such a case, there is the possibility of not being able to discern collation data corresponding to data to be collated, merely by altering the threshold of authentication as in Patent Document 1 described above.

An object of the present invention is to provide an information processing device, an authentication system, an authentication method, and a program which are capable of improving the accuracy of individual authentication using biological information.

A first aspect of the present invention relates to an information processing device. According to the first aspect, there is provided an information processing device including: a first acquisition unit that acquires first biological data which is biological feature data of a collated object and attribute information relating to the first biological data; a collation unit that refers to a collation data storage unit that stores a plurality of pieces of second biological data which are biological feature data for use in collating the first biological data, and collates the first biological data with each piece of the second biological data; a second acquisition unit that acquires attribute information for each piece of the second biological data from an attribute information storage unit that stores attribute information associated with each piece of the second biological data; and a specification unit that compares the attribute information acquired together with the first biological data with the attribute information associated with each piece of the second biological data, and specifies at least one of the pieces of second biological data corresponding to the first biological data, on the basis of a result of the comparison and a result of the collation.

A second aspect of the present invention relates to an authentication system. According to the second aspect, there is provided an authentication system including an information processing device and a server. The information processing device includes a first acquisition unit that acquires first biological data which is biological feature data of a collated object and attribute information relating to the first biological data, and a transmission unit that transmits the first feature data and the attribute information. The server includes a receiving unit that receives the first feature data and the attribute information, a collation unit that refers to a collation data storage unit that stores a plurality of pieces of second biological data which are biological feature data for use in collating the first biological data, and collates the first biological data with each piece of the second biological data, a second acquisition unit that acquires attribute information for each piece of the second biological data from an attribute information storage unit that stores attribute information associated with each piece of the second biological data, and a specification unit that compares the attribute information acquired together with the first biological data with the attribute information associated with each piece of the second biological data, and specifies at least one of the pieces of second biological data corresponding to the first biological data, on the basis of a result of the comparison and a result of the collation.

A third aspect of the present invention relates to an authentication method. According to the third aspect, there is provided an authentication method including causing a computer to: acquire first biological data which is biological feature data of a collated object and attribute information relating to the first biological data; refer to a collation data storage unit that stores a plurality of pieces of second biological data which are biological feature data for use in collating the first biological data, and collate the first biological data with each piece of the second biological data; acquire attribute information for each piece of the second biological data from an attribute information storage unit that stores attribute information associated with each piece of the second biological data; and compare the attribute information acquired together with the first biological data with the attribute information associated with each piece of the second biological data, and specify at least one of the pieces of second biological data corresponding to the first biological data, on the basis of a result of the comparison and a result of the collation.

Meanwhile, another aspect of the present invention may be a program causing at least one computer to implement the configuration of each of the aspects, and may be a computer readable recording medium having such a program recorded thereon. Such a recording medium includes a non-transitory tangible medium.

According to the present invention, it is possible to improve the authentication accuracy of individual authentication using biological information.

BRIEF DESCRIPTION OF THE DRAWINGS

The above-mentioned objects, other objects, features and advantages will be made clearer from the preferred embodiments described below, and the following accompanying drawings.

DESCRIPTION OF EMBODIMENTS

Figure 1:
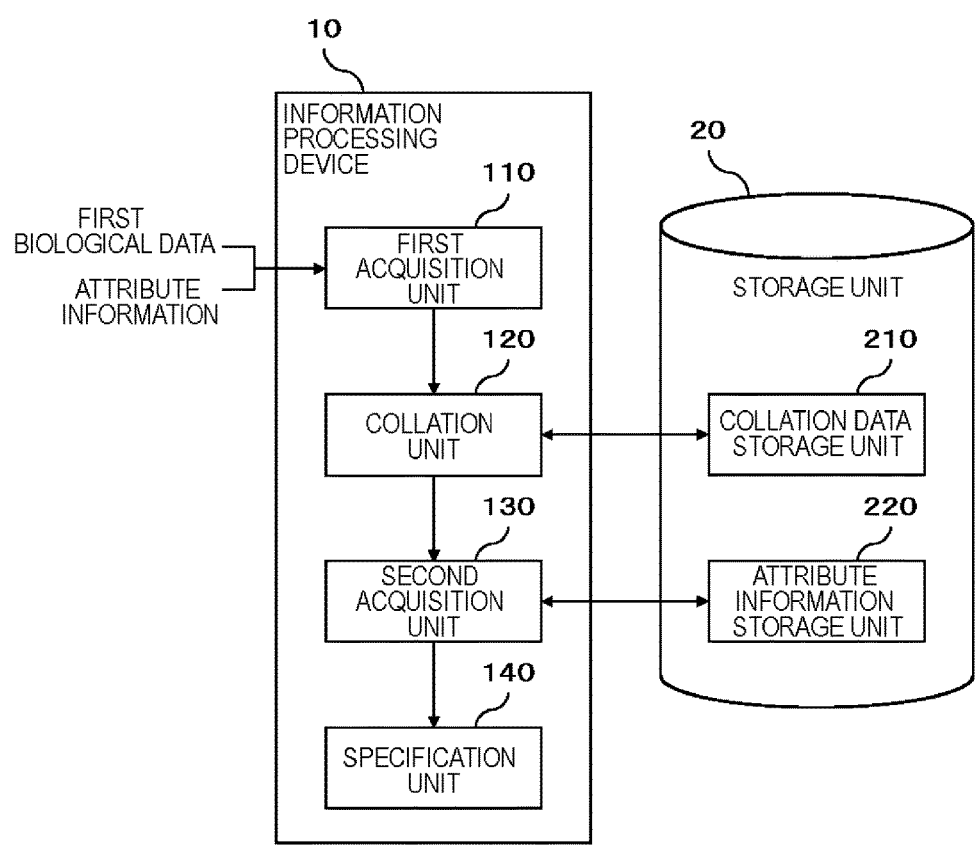
FIG. 1 is a block diagram illustrating a process configuration example of an information processing device according to a first embodiment.

Hereinafter, embodiments of the present invention will be described with reference to the accompanying drawings. In all the drawings, like elements are referenced by like reference numerals and descriptions thereof will not be repeated.

First Embodiment

[Process Configuration]

FIG. 1 is a block diagram illustrating a process configuration example of an information processing device 10 according to a first embodiment. The information processing device 10 specifies a person corresponding to first biological data, using information stored in a storage unit 20. The term "first biological data" as used herein indicates biological feature data of a collated object. In addition, examples of the "biological feature" capable of being used include physical features such as a person's face, fingerprint and vein, or behavioral features such as handwriting, voiceprint, and eyewink. In addition, the "biological feature data" may be, for example, data itself such as image data or audio data indicating the features as described above, and may be feature amount data which is extracted from the image data, the audio data or the like. In addition, the biological feature data may be data including only any one of these features, and may be data including a plurality of features.

The storage unit 20 stores information which is used in the collation of the first biological data. Specifically, the storage unit 20 includes a collation data storage unit 210 and an attribute information storage unit 220. The collation data storage unit 210 stores a plurality of pieces of second biological data. The "second biological data" refers to biological feature data for use in collating the first biological data, and is previously associated with a specific person. That is, it can also be said that the second biological data is proper biological feature data indicating a specific person.

The attribute information storage unit 220 stores attribute information which is associated with each piece of the second biological data. Here, the attribute information refers to information indicating an attribute relating to the first biological data or the second biological data, and the type of attribute of the attribute information is not limited. In addition, the attribute information includes at least one of position information and time information.

The attribute information of the first biological data indicates attributes relating to a person of a collated object who is not specified as an individual in the information processing device 10, or the person's biological feature data. Although described later in detail, as an example of the attribute information of the first biological data, at least one of position information and time information at an acquisition timing of the first biological data is exemplified. When the position and the time at which the first biological data is captured, frequency of capturing the first biological data, and the like may be used in the attribute information of the first biological data, a position at which a person indicated by the first biological data is present and a time at which the first biological data is acquired from the person may be used in the attribute information of the first biological data.

In addition, the attribute information of the second biological data indicates attributes at any timing relating to a person specified as an individual in the information processing device 10. In this manner, the attribute information of the second biological data indicates attributes relating to a specific individual indicated by the second biological data, whereas the attribute information of the first biological data indicates attributes relating to an unspecified individual indicated by the first biological data, or the first biological data. In this point, both are conceptually different from each other. Examples of the attribute information of the second biological data include the position and the time at which a person indicated by the second biological data is captured by a monitoring camera, frequency of capturing the person by the monitoring camera, and the like. In addition, the attribute information which is associated with the second biological data is not limited thereto, and covers a wide range of a commercial product purchased by a person indicated by the second biological data, a store at which the commercial product is purchased, and the like. These pieces of attribute information are stored in the attribute information storage unit 220 on the basis of, for example, input information or the like from other external systems. Meanwhile, the storage unit 20 may be included in other devices located outside of the information processing device 10, and may be included in the information processing device 10. In addition, in the example shown in FIG. 1, the collation data storage unit 210 and the attribute information storage unit 220 are distinguished from each other as separate storage units, but may be integrated into one storage unit.

In addition, in the present embodiment, the information processing device 10 includes a first acquisition unit 110, a collation unit 120, a second acquisition unit 130, and a specification unit 140.

The first acquisition unit 110 acquires first biological data and attribute information relating to the first biological data. The first acquisition unit 110 can capture, for example, an image indicating physical features such as a person's face through an imaging unit (not shown) such as a camera or the like, and acquire data of the image as biological feature data. In addition, the first acquisition unit 110 can also pick up, for example, audio through a sound collection unit (not shown) such as a microphone, and acquire data of the audio as biological feature data. In addition, the first acquisition unit 110 may extract feature amounts from the image data and the audio data, and acquire the extracted feature amounts as biological feature data. In addition, the first acquisition unit 110 acquires information such as a position, time or the like when the first biological data is acquired, as attribute information relating to the first biological data. The first acquisition unit 110 can acquire time information indicating the date and time when the first biological data is acquired, as attribute information relating to the first biological data, on the basis of, for example, the system time or the like of the information processing device 10. In addition, the first acquisition unit 110 can acquire position information indicating the position of the information processing device 10 when the first biological data is acquired, as attribute information relating to the first biological data, on the basis of, for example, global positioning system (GPS) information, information of the surrounding base station, or the like.

In addition, other devices located outside of the information processing device 10 may include the imaging unit and the sound collection unit described above, and the first acquisition unit 110 may acquire the first biological data and the attribute information by communication with the other devices.

The collation unit 120 refers to the collation data storage unit 210, and collates the first biological data acquired by the first acquisition unit 110 with each piece of the second biological data stored in the collation data storage unit 210. Specifically, the collation unit 120 matches the feature amount of the first biological data with the feature amount of the second biological data, and calculates the similarity (biological similarity) of biological feature data.

The second acquisition unit 130 acquires attribute information for each piece of the second biological data from the attribute information storage unit 220. Here, the second acquisition unit 130 may acquire all the pieces of attribute information associated with each piece of the second biological data, and may acquire only attribute information corresponding to the attribute information acquired together with the first biological data, among all the pieces of attribute information associated with each piece of the second biological data.

The specification unit 140 specifies the second biological data corresponding to the first biological data. Specifically, the specification unit 140 compares the attribute information acquired together with the first biological data with the attribute information associated with each piece of the second biological data. The specification unit 140 specifies at least one of the pieces of second biological data corresponding to the first biological data acquired by the first acquisition unit 110, on the basis of the result of comparison and the result of collation performed by the collation unit 120. In this manner, the specification unit 140 specifies second biological data having attribute information close to the attribute information of the first biological data.

In addition, as a specific example, the specification unit 140 can specify the second biological data corresponding to the first biological data as follows. The specification unit 140 weights the result of collation performed by the collation unit 120, using the result of the comparison of the attribute information of the first biological data with the attribute information of each piece of the second biological data, and specifies the second biological data corresponding to the first biological data. Specifically, the specification unit 140 matches the attribute information acquired together with the first biological data with the attribute information of each piece of the second biological data acquired by the second acquisition unit 130, and calculates the similarity (attribute similarity) of the attribute information. For example, when the attribute information is assumed to be position information, the specification unit 140 calculates a distance between position information acquired together with the first biological data and position information associated with the second biological information. The specification unit 140 calculates attribute similarities of the first biological data and the second biological data, using a function or the like in which a higher attribute similarity is calculated as the distance becomes closer. The specification unit 140 weights the biological similarity, using the attribute similarity itself obtained from the comparison result, a weight coefficient according to the magnitude of the attribute similarity, or the like. The specification unit 140 specifies second biological data in which the weighted biological similarity being equal to or greater than a predetermined threshold, as the second biological data corresponding to the first biological data. In addition, the specification unit 140 may calculate the added-up value, average value, or the like of the biological similarity and the attribute similarity, and specify second biological data in which the calculated value being equal to or greater than a predetermined threshold, as the second biological data corresponding to the first biological data.

In another example, individual thresholds are set in the biological similarity and the attribute similarity, and the specification unit 140 may specify second biological data in which both the biological similarity and the attribute similarity exceed a threshold, as the second biological data corresponding to the first biological data.

In addition, without using a predetermined threshold, the specification unit 140 may specify second biological data having a largest value calculated on the basis of the biological similarity and the attribute similarity, as the second biological data corresponding to the first biological data.

In addition, when a plurality of pieces of second biological data corresponding to the first biological data are specified, the specification unit 140 may determine the priorities of the specified plurality of pieces of second biological data, on the basis of the result of comparison and the result of collation. The specification unit 140 of the present embodiment can determine the priority of the second biological data becomes higher as the biological similarity weighted in accordance with the attribute similarity becomes higher. In addition, the specification unit 140 may determine, among the pieces of second biological data in which the biological similarity exceeds a predetermined threshold, the priority becomes higher as the attribute similarity of second biological data becomes higher. In this manner, the information processing device 10 can determine second biological data having a highest possibility of corresponding to the first biological data.

In addition, for example, a priority may be set for each type of attribute information such as the "position information" or the "time information". The specification unit 140 specifies the second biological data corresponding to the first biological data, on the basis of the comparison result for each type of attribute information of the first biological data and the second biological data, the priority for each type of attribute information, and the result of collation. For example, a case is considered in which there are two pieces of second biological data with which the attribute information of the "position information" and the "time information" is associated. In such a case, a result of the comparison of a certain piece of first biological data with each piece of the second biological data is that one piece of second biological data has an attribute similarity of the position information higher than that of the other piece of second biological data, and has an attribute similarity of the time information lower than that. Here, when the time information has a priority higher than that of the position information, the specification unit 140 determines the former second biological data as the second biological data corresponding to the first biological data.

[Hardware Configuration]

Figure 2:
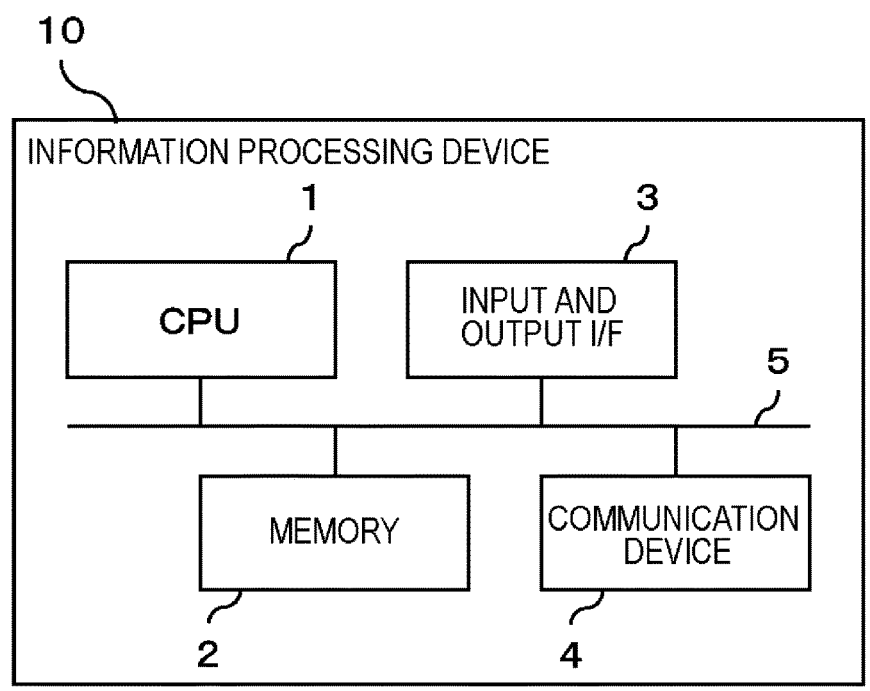
FIG. 2 is a diagram conceptually illustrating a hardware configuration example of the information processing device according to the first embodiment.

FIG. 2 is a diagram conceptually illustrating a hardware configuration example of the information processing device 10 according to the first embodiment. In FIG. 2, the information processing device 10 includes a central processing unit (CPU) 1, a memory 2, an input and output interface (I/F) 3, a communication device 4, and the like which are connected to each other through a bus 5. The memory 2 is a random access memory (RAM), a read only memory (ROM), a hard disk, a portable recording medium, or the like. The input and output I/F 3 is capable of being connected to a user interface device such as a display device (not shown) or an input device (not shown). The communication device 4 communicates with other devices through a wired network or a wireless network. Meanwhile, FIG. 2 is an example, and the hardware configuration of the information processing device 10 is not limited to FIG. 2.

Each processing unit of the information processing device 10 described previously is implemented, for example, by a program stored in the memory 2 being executed by the CPU 1. In addition, the program may be installed from a portable recording medium such as, for example, a compact disc (CD) or a memory card, or other computers on a network through the input and output I/F 3, and be stored in the memory 2.

Operation Example

Figure 3:
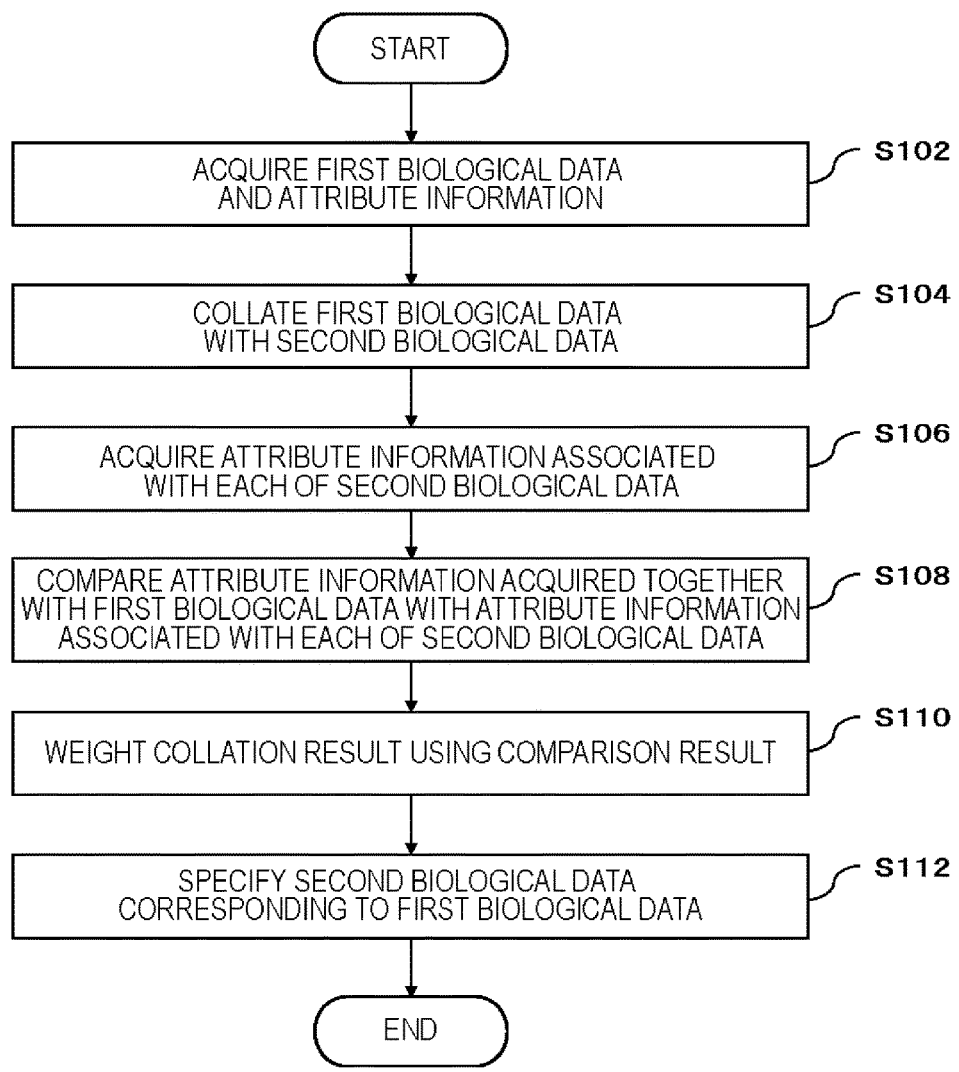
FIG. 3 is a flow diagram illustrating a flow of processes in the information processing device according to the first embodiment.

A flow of processes in the information processing device 10 according to the present embodiment will be described with reference to FIG. 3. FIG. 3 is a flow diagram illustrating a flow of processes in the information processing device 10 according to the first embodiment.

The information processing device 10 acquires first biological data and attribute information (S102). The information processing device 10 collates the first biological data acquired in S102 with each of a plurality of pieces of second biological data stored in the collation data storage unit 210, and calculates a biological similarity (S104). The information processing device 10 acquires attribute information associated with each piece of the plurality of pieces of second biological data from the attribute information storage unit 220 (S106). The information processing device 10 compares the attribute information acquired together with the first biological data with attribute information associated with each piece of the second biological data, and calculates an attribute similarity (S108). The information processing device 10 weights the biological similarity obtained as the collation result of S104, using the attribute similarity obtained as the comparison result of S108 (S110). The information processing device 10 specifies the second biological data corresponding to the first biological data, on the basis of the result of weighting (S112). Here, when the plurality of pieces of second biological data are specified, the information processing device 10 may determine priorities of the plurality of pieces of specified second biological data, on the basis of the result of weighting. The information processing device 10 determines a specific person which is associated with the second biological data specified herein to be a person corresponding to the first biological data.

[Operation and Effect]

As described above, in the present embodiment, attribute information is acquired together with the first biological data, and the attribute information is compared with attribute information of the second biological data. A result of the collation of the first biological data with the second biological data is examined using the comparison result, and the second biological data corresponding to the first biological data is specified.

Thereby, according to the present embodiment, a result of the comparison of attribute information which is sent together with biological feature data to be collated, with attribute information having reliability which is held in association with proper biological feature data (biological feature data used for collation) associated with each individual is considered in addition to the result of collation between the pieces of biological feature data, and thus a specific person corresponding to the biological feature data to be collated can be specified with a high degree of accuracy.

In addition, in the related art, since there is a limit to collation accuracy between the pieces of biological feature data, other information such as a user ID or a password is also required. However, according to the present embodiment, as described above, it is possible to improve the specification accuracy of a person corresponding to the biological feature data to be collated, and thus it is possible to use the biological feature data as an ID for specifying an individual. Thereby, individual authentication can be performed by causing a system to just read the biological feature data to be collated without performing the registration of a user ID or a password in the system or an input during the collation thereof, and thus it is possible to simplify the procedure of authentication.

Second Embodiment

The present embodiment is the same as the first embodiment, except for the following points.

[Process Configuration]

Figure 4:
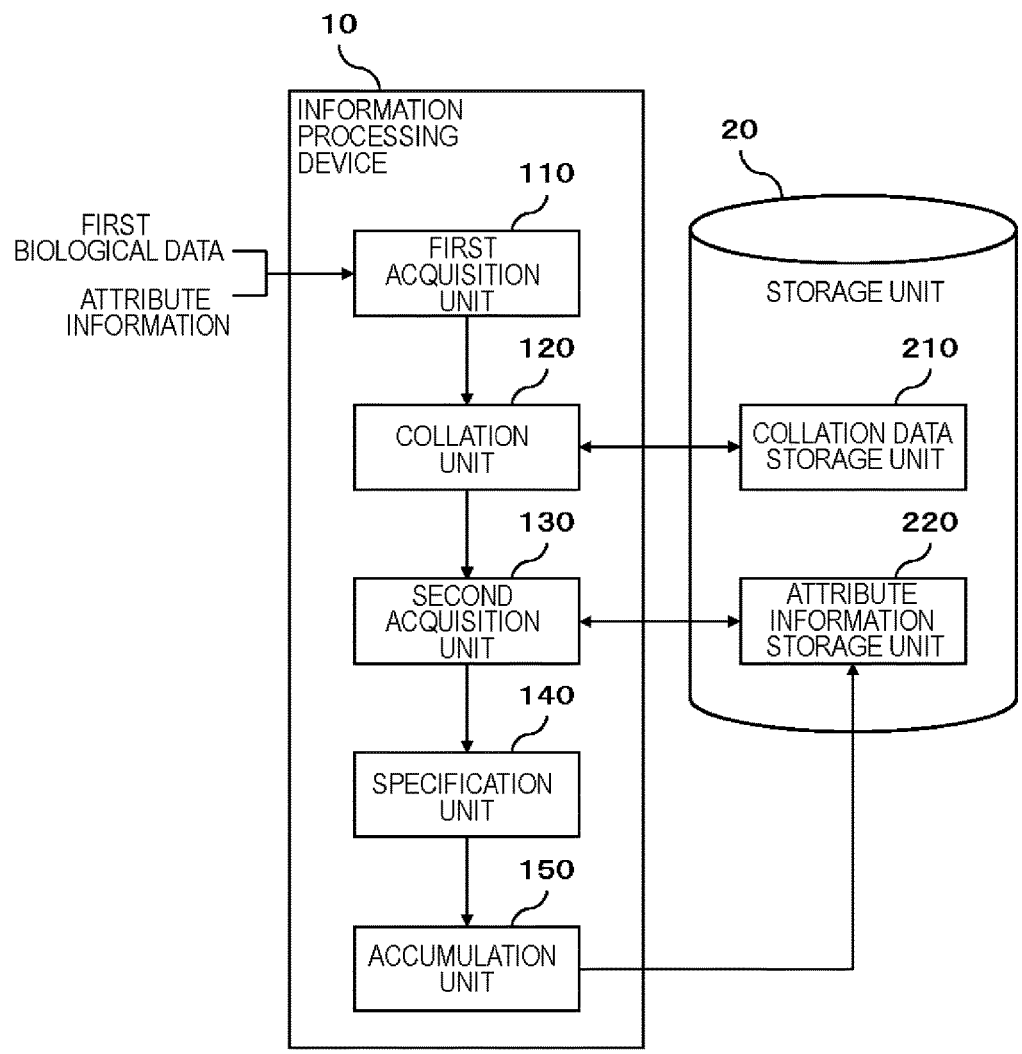
FIG. 4 is a block diagram illustrating a process configuration example of an information processing device according to a second embodiment.

FIG. 4 is a block diagram illustrating a process configuration example of an information processing device 10 according to a second embodiment. The information processing device 10 of the present embodiment further includes an accumulation unit 150.

The accumulation unit 150 accumulates the attribute information acquired together with the first biological data by the first acquisition unit 110, as attribute information to be associated with the second biological data specified to correspond to the first biological data by the specification unit 140, in the attribute information storage unit 220. When a plurality of pieces of second biological data corresponding to the first biological data are specified by the specification unit 140, the accumulation unit 150 accumulates the attribute information acquired together with the first biological data in association with second biological data having a highest possibility of corresponding to the first biological data. For example, as described in the first embodiment, the accumulation unit 150 can specify second biological data having a highest possibility of corresponding to the first biological data, on the basis of the result of the collation of the first biological data with the second biological data, and the result of the comparison of the attribute information of the first biological data with that of the second biological data.

Operation Example

Figure 5:
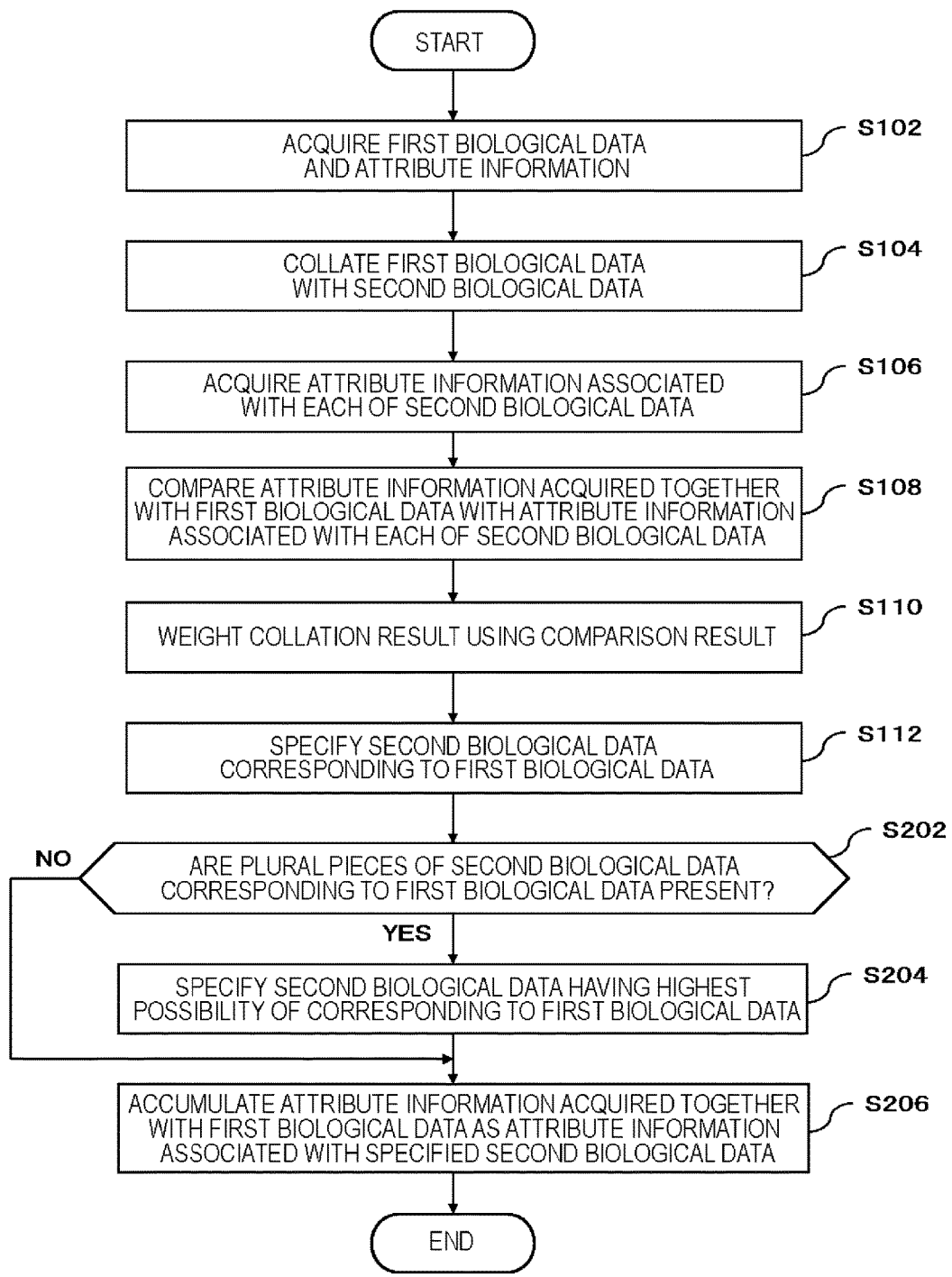
FIG. 5 is a flow diagram illustrating a flow of processes in the information processing device according to the second embodiment.

A flow of processes in the information processing device 10 according to the present embodiment will be described with reference to FIG. 5. FIG. 5 is a flow diagram illustrating a flow of processes in the information processing device 10 according to the second embodiment.

In S112, the information processing device 10 determines whether a plurality of pieces of second biological data corresponding to the first biological data are specified (S202). When a plurality of second biological data corresponding to the first biological data are present (S202: YES), the information processing device 10 specifies second biological data having a highest possibility of corresponding to the first biological data (S204). The information processing device 10 accumulates the attribute information acquired together with the first biological information in S102, as attribute information associated with the second biological data specified in S204, in the attribute information storage unit 220 (S206). On the other hand, when one piece of second biological data corresponding to the first biological data (S202: NO), the attribute information acquired together with the first biological data in S102 is accumulated as attribute information associated with the second biological data specified in S112, in the attribute information storage unit 220 (S206).

[Operation and Effect]

As described above, in the present embodiment, the attribute information acquired together with the first biological data is accumulated in the attribute information storage unit 220 in association with the second biological data specified as the second biological data corresponding to the first biological data.

Thereby, according to the present embodiment, the second biological data associated with a certain individual and latest attribute information of the individual are associated with each other, and thus it is possible to improve the reliability of the second biological data.

In this manner, according to the present embodiment, it is possible to automatically collect attribute information relating to each individual having received individual authentication, using the biological feature data (first biological data and second biological data). Thereby, according to the present embodiment, the attribute information accumulated by such automatic collection can be utilized as marketing information. Specifically, face authentication through an in-store monitoring camera or the like is performed, and thus it is also possible to collect and analyze information (such as purchase rate or visiting frequency) relating to not only customers who have purchased commercial products, but also merely visiting customers. In addition, it is also possible to automatically collect in-store flow data for each customer, and to analyze the tendency. Further, when a face image is used as biological feature data, according to the present embodiment, it is possible to extract and utilize even information such as the age or sex of customers through image processing.

Further, in the present embodiment, since an individual can be specified using only biological feature data and attribute information without using an individual ID or a password a point card or the like is not required. In addition, since a customer management system or the like is also not required to be newly introduced in order to acquire the attribute information of each individual as described above, it is possible to reduce an initial investment.

In addition, in the present embodiment, a simple data configuration is taken in which the biological feature data and the attribute information are managed in association with each other, and thus there is also the advantage of the coordination of data with other systems that manage the attribute information having a tendency to be taken. This is because information, such as the biological feature data, invariable for each individual to a certain extent, rather than individual identification data such as an individual ID or a password capable of being replaced for each system is used as individual identification data. Thus, it also becomes easier to manage attribute information of each individual integrally between a plurality of systems that manage the attribute information of each individual.

Third Embodiment

The present embodiment is the same as the first embodiment, except for the following points.

[Process Configuration]

Figure 6:
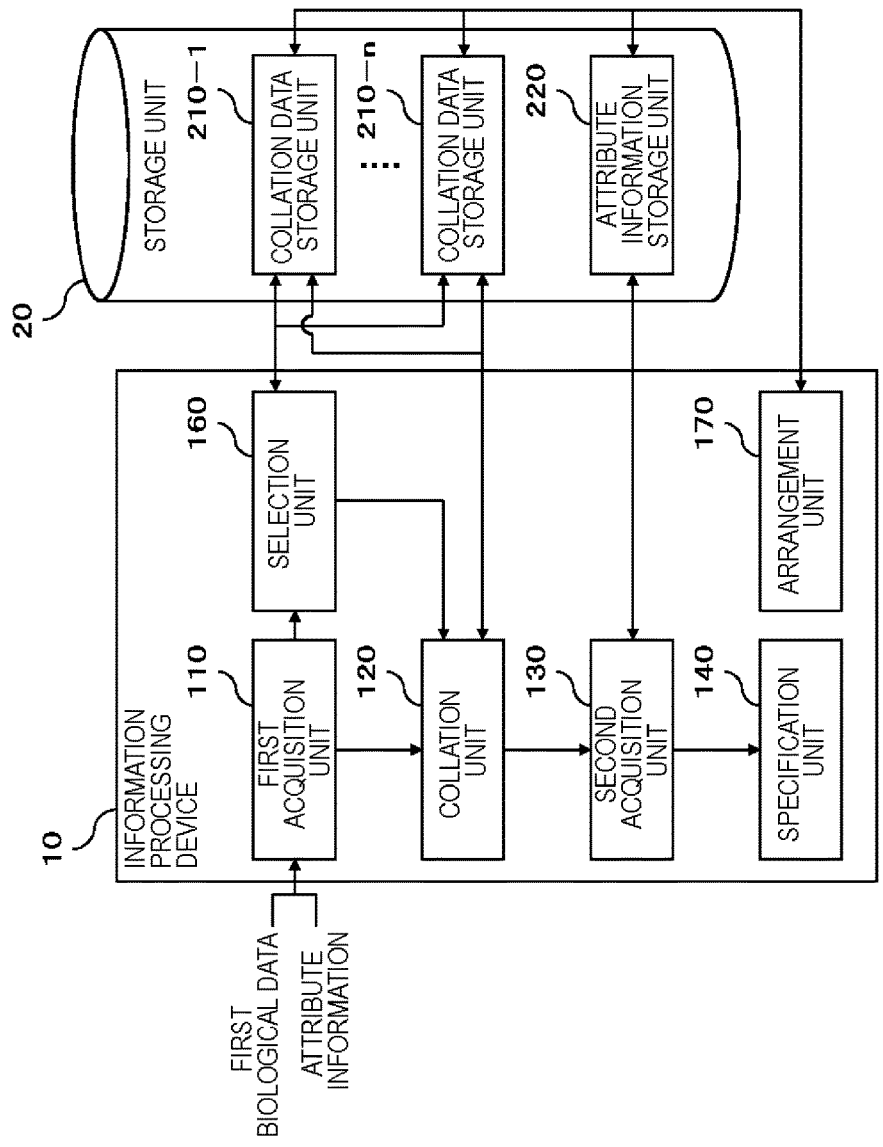
FIG. 6 is a block diagram illustrating a process configuration example of an information processing device according to a third embodiment.

FIG. 6 is a block diagram illustrating a process configuration example of an information processing device 10 according to a third embodiment. The information processing device 10 of the present embodiment further includes a selection unit 160 and an arrangement unit 170. In addition, as shown in FIG. 6, in the present embodiment, a plurality of collation data storage unit 210 (210-1 to 210-*n* of FIG. 6) are present in accordance with the section of the attribute information. The term "section of the attribute information" as used herein refers to a unit by which attribute information of a certain type is grouped on the basis of specific conditions. Specifically, for example, when the attribute information is position information, prefectures such as "Tokyo", "Osaka", or "Fukuoka" and districts such as "Kanto", "Kinki", or "Kyushu" can be set to the section of the attribute information. The same second biological data may be stored in the plurality of collation data storage units 210, and different pieces of second biological data may be stored on the basis of the section of the attribute information of the collation data storage units 210. In addition, the plurality of collation data storage units 210 may be respectively disposed on physically different devices, and may be disposed on one device.

The selection unit 160 selects a collation data storage unit 210 to be referred to during collation from the plurality of collation data storage units 210, on the basis of the attribute information acquired together with the first biological data. The collation unit 120 refers to the collation data storage unit 210 selected by the selection unit 160, and collates the first biological data with the second biological data. In addition, the second acquisition unit 130 uses second biological data, stored in the collation data storage unit 210 selected by the selection unit 160, as a target, to acquire attribute information associated with the second biological data from the attribute information storage unit 220.

The arrangement unit 170 moves or copies second biological data stored in a certain collation data storage unit 210, to another collation data storage unit 210 corresponding to attribute information associated with the second biological data. Specifically, the arrangement unit 170 determines the characteristics of the second biological data on the basis of each piece of the attribute information associated with the second biological data, and specifies a collation data storage unit 210 required to store the second biological data, from the plurality of collation data storage units 210, on the basis of the characteristics and the section of the attribute information corresponding to the collation data storage unit 210. The arrangement unit 170 moves or copies the second biological data to the specified collation data storage unit 210.

Operation Example

Figure 7:
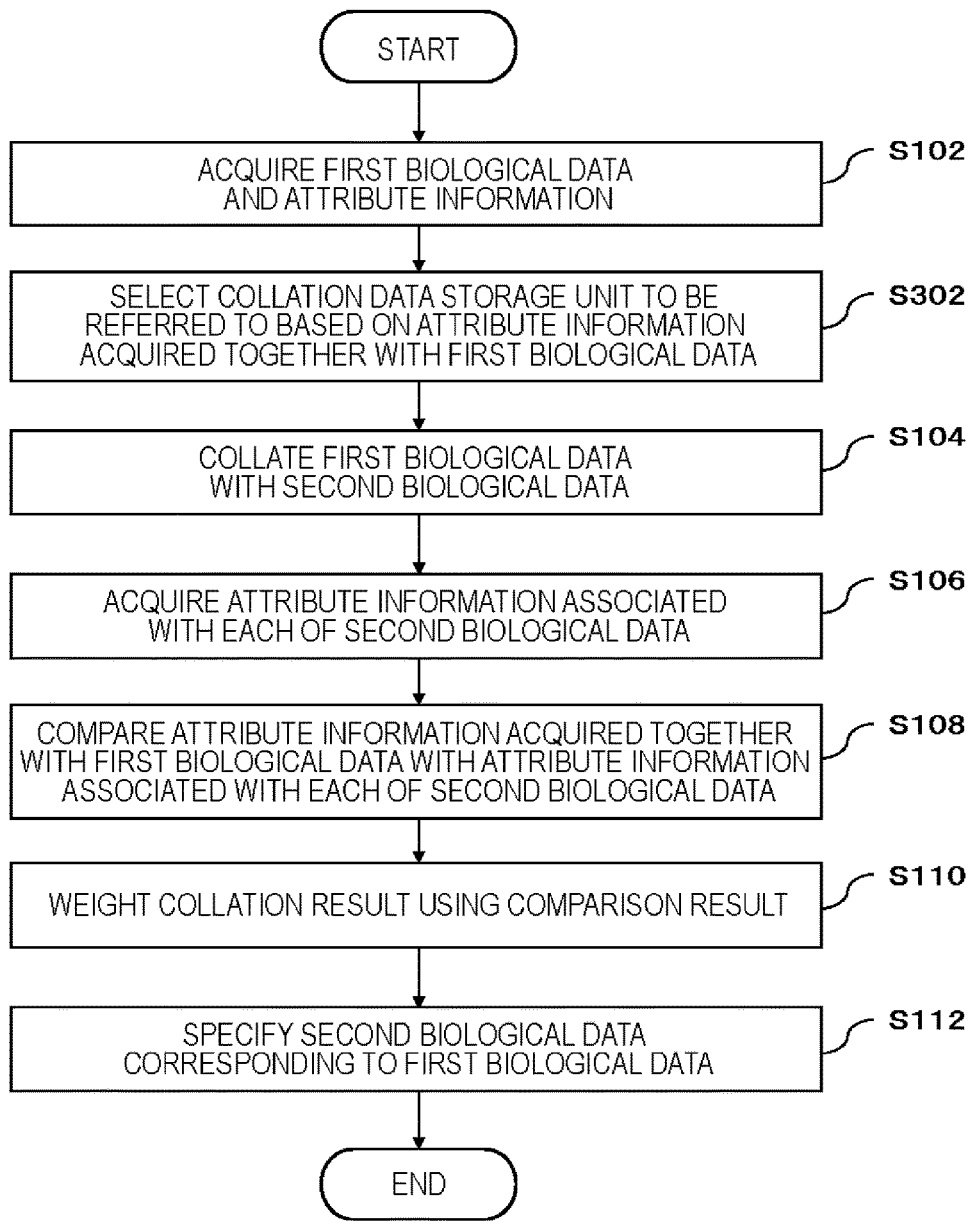
FIG. 7 is a flow diagram illustrating a flow of processes in which the information processing device according to the third embodiment specifies second biological data corresponding to first biological data.
Figure 8:
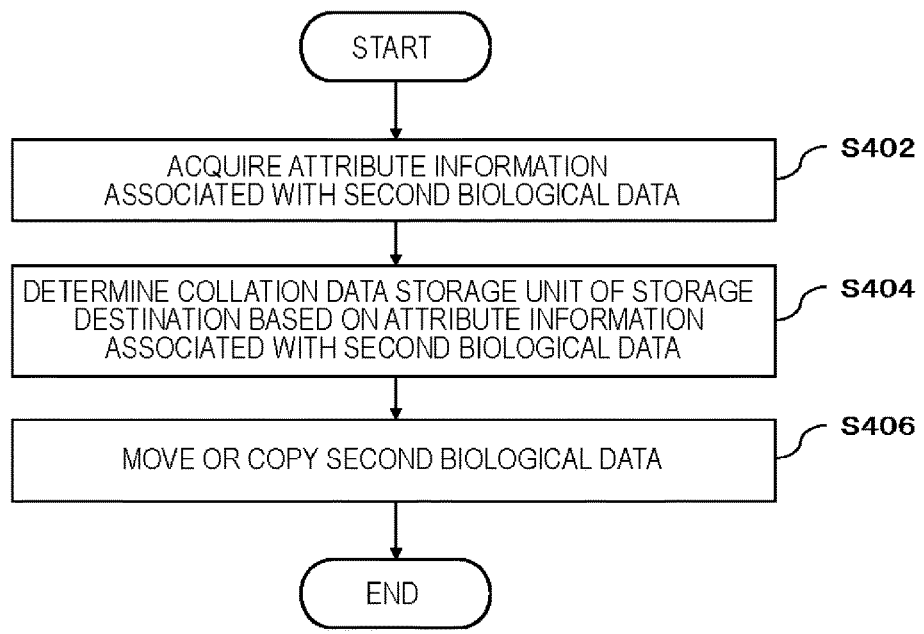
FIG. 8 is a flow diagram illustrating a flow of processes in which the information processing device according to the third embodiment moves or copies the second biological data.

A flow of processes in the information processing device 10 according to the present embodiment will be described with reference to FIGS. 7 and 8. FIG. 7 is a flow diagram illustrating a flow of processes in which the information processing device 10 according to the third embodiment specifies second biological data corresponding to the first biological data. FIG. 8 is a flow diagram illustrating a flow of processes in which the information processing device 10 according to the third embodiment moves or copies the second biological data.

First, reference will be made to FIG. 7 to describe a flow of processes in which the information processing device 10 according to the third embodiment specifies the second biological data corresponding to the first biological data.

The information processing device 10 selects a collation data storage unit 210 to be referred to during collation, on the basis of the attribute information acquired together with the first biological data in S102 (S302). In S104, the information processing device 10 refers to the collation data storage unit 210 selected in S302, and collates the first biological data with the second biological data. In addition, in S106, attribute information associated with second biological data stored in the collation data storage unit 210 selected in S302 is acquired.

Next, reference will be made to FIG. 8 to describe a flow of processes in which the information processing device 10 according to the third embodiment moves or copies the second biological data.

The information processing device 10 acquires attribute information associated with each piece of the second biological data (S402). The information processing device 10 determines a collation data storage unit 210 that stores the second biological data, on the basis of the attribute information associated with each piece of the second biological data and the section of the attribute information corresponding to the collation data storage unit 210 (S404). The information processing device 10 moves or copies the second biological data to the collation data storage unit 210 determined in S404 (S406).

[Operation and Effect]

As described above, in the present embodiment, a collation data storage unit 210 used during collation is selected in accordance with the attribute information acquired together with the first biological information. Thereby, according to the present embodiment, since a collation data storage unit 210 having a high possibility of the second biological data corresponding to the first biological information being present can be selected as the collation data storage unit 210 during collation, it becomes easier to specify the second biological data corresponding to the first biological data.

In addition, second biological data stored in a certain collation data storage unit 210 is moved or copied to another collation data storage unit 210 in accordance with the attribute information associated with the second biological data. Thereby, according to the present embodiment, the second biological data can be stored in an appropriate collation data storage unit 210, and it becomes easier to specify the second biological data corresponding to the first biological data.

Meanwhile, the information processing device 10 of the present embodiment is configured on the basis of the information processing device 10 of the first embodiment, but may further include the accumulation unit 150 of the second embodiment.

Meanwhile, in the present embodiment, a configuration example has been described in which the information processing device 10 includes the selection unit 160 that selects the collation data storage unit 210 used during collation on the basis of the attribute information of the first biological data. However, the information processing device 10 may not include the selection unit 160. In such a case, when the second biological data corresponding to the first biological data is not able to be specified in a certain collation data storage unit 210, the information processing device 10 may have a configuration in which a reference destination is switched to another collation data storage unit 210.

In addition, in a configuration in which a plurality of pairs between the information processing device 10 and the storage unit 20 are present, there may be an aspect in which the selection unit 160 is not present. In this aspect, when the second biological data corresponding to the first biological data is not present in the storage unit 20 forming a pair, the information processing device 10 transmits the first biological data and the attribute information of the first biological data to another information processing device 10, and another information processing device 10 specifies the second biological data corresponding to the first biological data.

In this manner, it is also possible to obtain an effect of the present embodiment.

Fourth Embodiment

Figure 9:
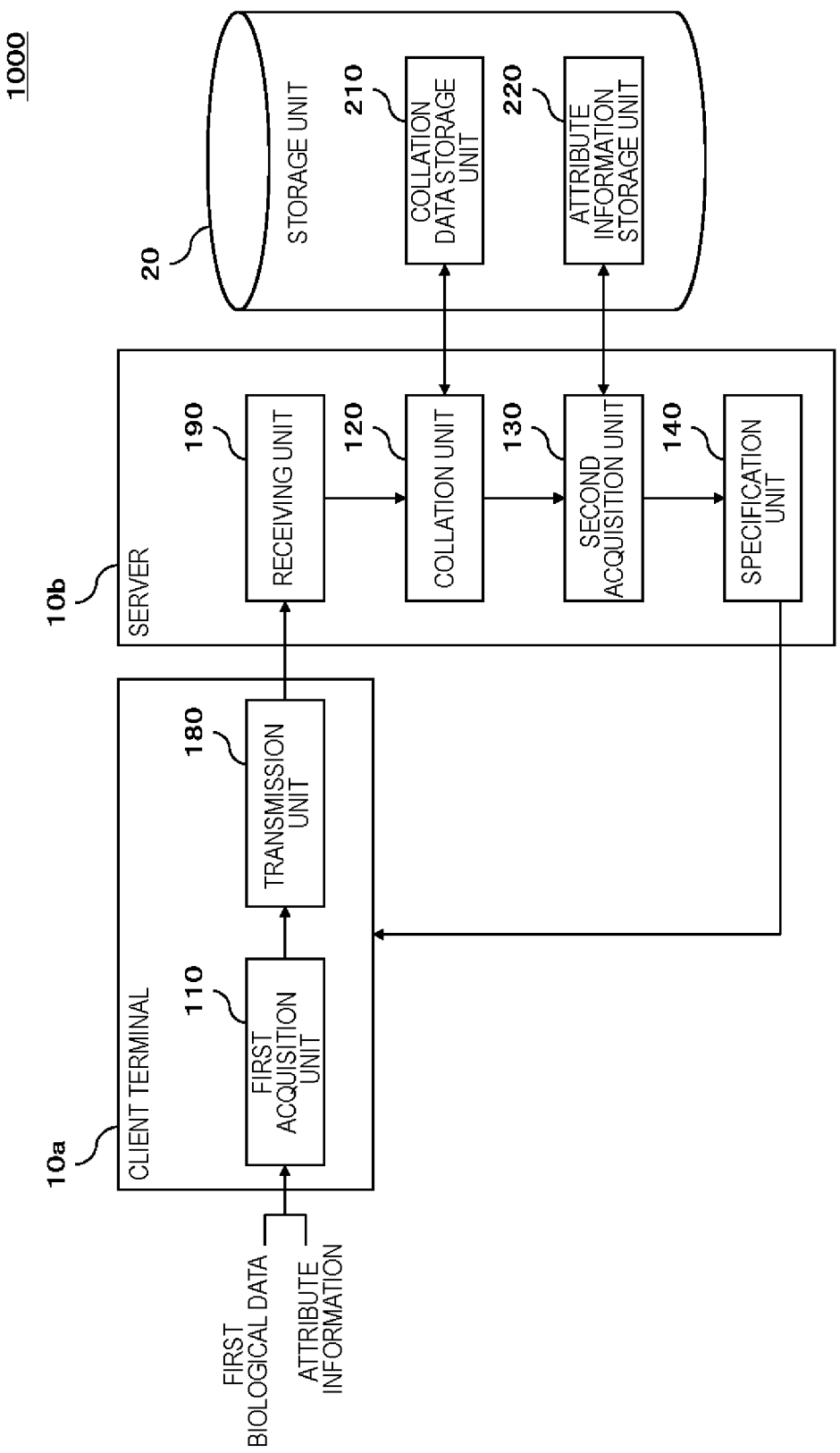
FIG. 9 is a block diagram illustrating a process configuration example of an authentication system according to a fourth embodiment.

Each processing unit of the information processing device 10 according to each of the aforementioned embodiments may be implemented as an authentication system 1000 including a client terminal 10a and a server 10b. FIG. 9 is a block diagram illustrating a process configuration example of the authentication system 1000 according to a fourth embodiment. In the example of FIG. 9, the authentication system 1000 is constructed on the basis of the information processing device 10 of the first embodiment.

The client terminal 10a includes a first acquisition unit 110 and a transmission unit 180. The transmission unit 180 transmits first biological data and attribute information which are acquired by the first acquisition unit 110 to the server 10b.

The server 10b includes a receiving unit 190, a collation unit 120, a second acquisition unit 130, and a specification unit 140. The receiving unit 190 receives the first biological data and the attribute information which are transmitted from the client terminal 10a. The server 10b specifies second biological data corresponding to the first biological data received by the receiving unit 190, and transmits the specified data to the client terminal 10*a*.

Operation Example

Figure 10:
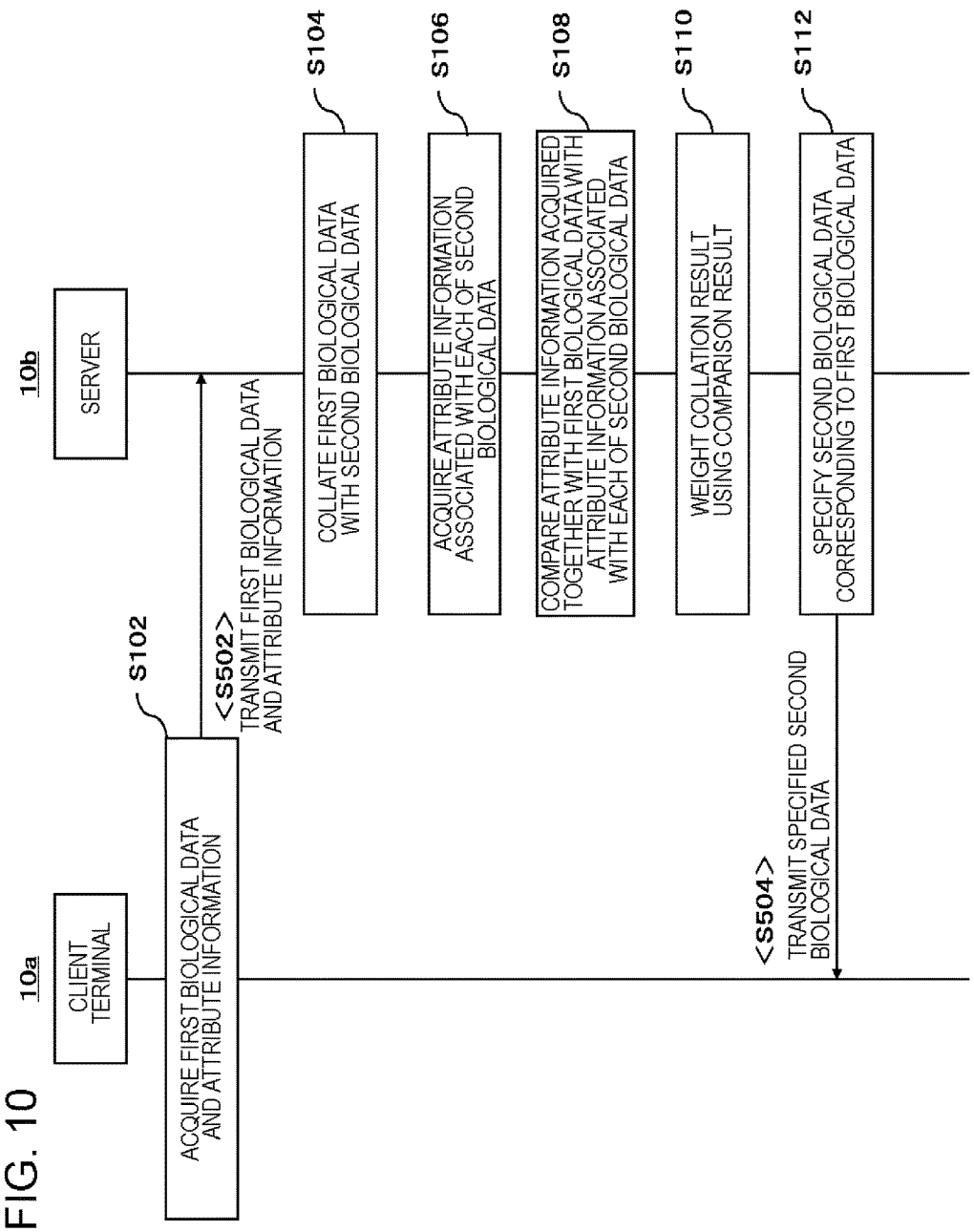
FIG. 10 is a sequence diagram illustrating a flow of processes in the authentication system according to the fourth embodiment.

A flow of processes in the authentication system 1000 according to the present embodiment will be described with reference to FIG. 10. FIG. 10 is a sequence diagram illustrating a flow of processes in the authentication system 1000 according to the fourth embodiment.

The client terminal 10*a* transmits the first biological data and the attribute information which are acquired in S102 to the server 10*b* (S502). The server 10*b* specifies second biological data corresponding to the first biological data, using the first biological data and the attribute information which are received (S104 to S112). The server 10*b* transmits the specified second biological data to the client terminal 10*a* (S504).

[Operation and Effect]

As described above, as in the present embodiment, even when each processing unit of the information processing device 10 is configured by division into the client terminal 10*a* and the server 10*b*, it is possible to obtain the same effect as that in the aforementioned embodiment.

Meanwhile, in the authentication system 1000 of the present embodiment, the client terminal 10*a* and the server 10*b* are configured on the basis of the information processing device 10 of the first embodiment, but may further include the accumulation unit 150 of the second embodiment or the selection unit 160 and the arrangement unit 170 of the third embodiment.

Hereinafter, a specific example of a service using the information processing device 10 or the authentication system 1000 according to each of the aforementioned embodiments will be described.

Example 1

Figure 11:
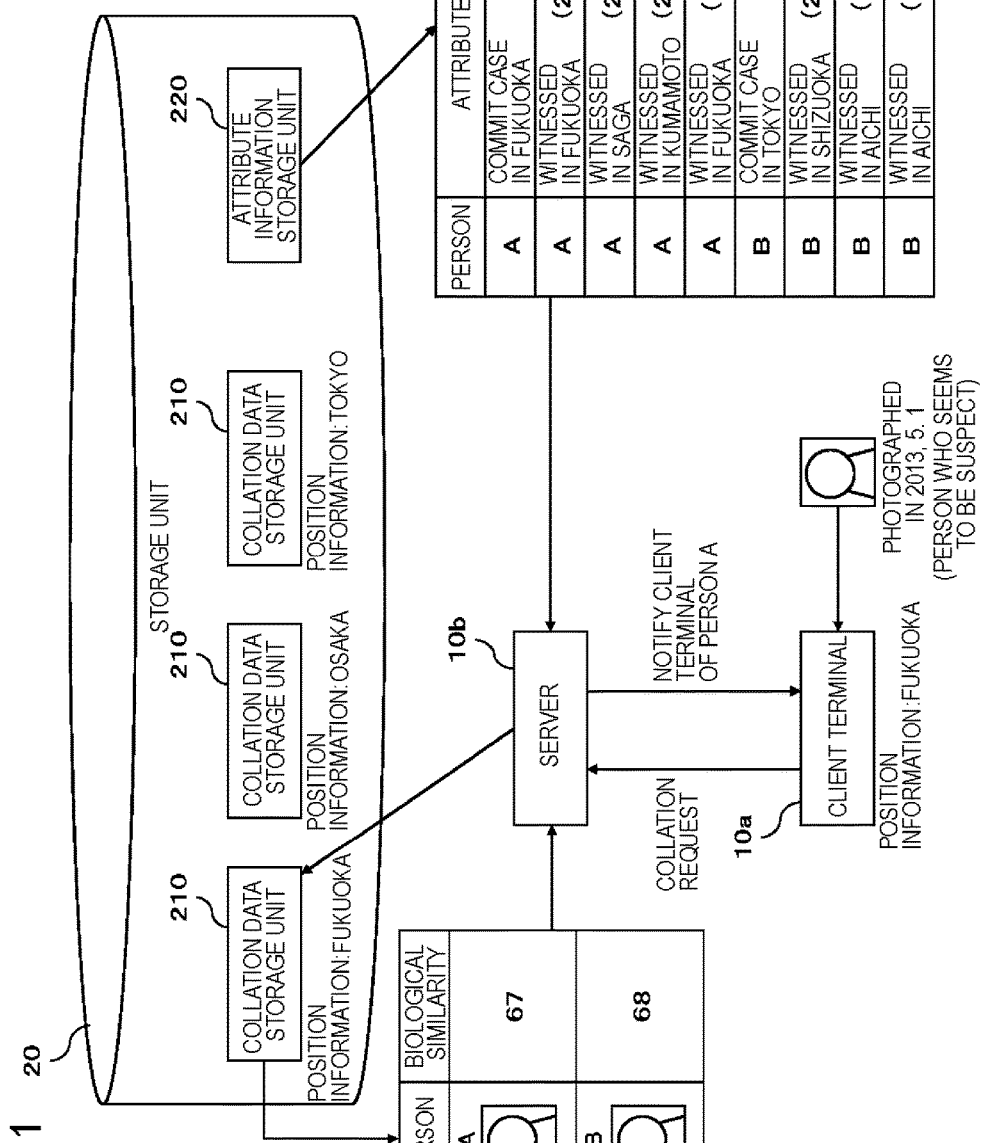
FIG. 11 is a diagram illustrating a configuration example of an authentication system according to Example 1.

In the present example, a service for collating a specific person will be described. FIG. 11 is a diagram illustrating a configuration example of an authentication system 1000 according to Example 1.

In the present example, the client terminal 10*a* is, for example, a portable terminal, a monitoring camera or the like which is possessed by a police officer. A region indicating biological features such as a person's face is cut out from an image captured by this client terminal 10*a*, and is acquired as first biological data. In addition, a position, time or the like at which this image is captured is acquired as attribute information. The client terminal 10*a* transmits a collation request including the first biological data and the attribute information which are acquired, to the server 10*b*. In the example of FIG. 11, since the client terminal 10*a* acquires the first biological data within Fukuoka Prefecture, "position information: Fukuoka" is acquired as the attribute information.

The server 10*b* specifies second biological data corresponding to the first biological data, using the first biological data and the attribute information which are received. In the example of FIG. 11, since the attribute information received from the client terminal 10*a* includes the "position information: Fukuoka", the server 10*b* selects a collation data storage unit 210 corresponding to the "position information: Fukuoka", as the collation data storage unit 210 used during collation. In addition, in the example of FIG. 11, pieces of second biological data of a person A and a person B are stored in the collation data storage unit 210 corresponding to the "position information: Fukuoka". Biological similarities of each piece of the second biological data and the first biological data received from the client terminal 10*a* are "67" and "68", respectively. Here, the server 10*b* specifies the second biological data corresponding to the person A as second biological data corresponding to the first biological data in this time, in consideration of a difference between the date of event occurrence and the date and time at which a collation request is transmitted, an average distance between position information included in the collation request and position information of witnessing information, a distance between the position information included in the collation request and a place of event occurrence, age estimated from the first biological data, age estimated from the second biological data, and the like. The server 10*b* notifies the client terminal 10*a* that a person corresponding to the first biological data is the person A. In this manner, a suspicious person can be specified just by transmitting the biological feature data.

In addition, this can also be used in applications of identity verification at the time of a disaster, the collation of a person on the blacklist as well as the suspicious person, and the like. In identity verification at the time of a disaster, a face photograph of a disaster victim is taken using the client terminal 10*a* such as a cellular phone, and position information of the disaster area is transmitted to the server 10*b* corresponding to the attribute information. Thereby, it is possible to specify a corresponding person and to confirm his/her safety. In the collation of a person on the blacklist, it is possible to monitor an image captured by a monitoring camera within a store using a PC, a tablet, a smartphone or the like (client terminal 10*a*) of an office, transmit an image of a suspicious person to the server 10*b*, and to determine whether being a person registered as a person on the blacklist.

Example 2

Figure 12:
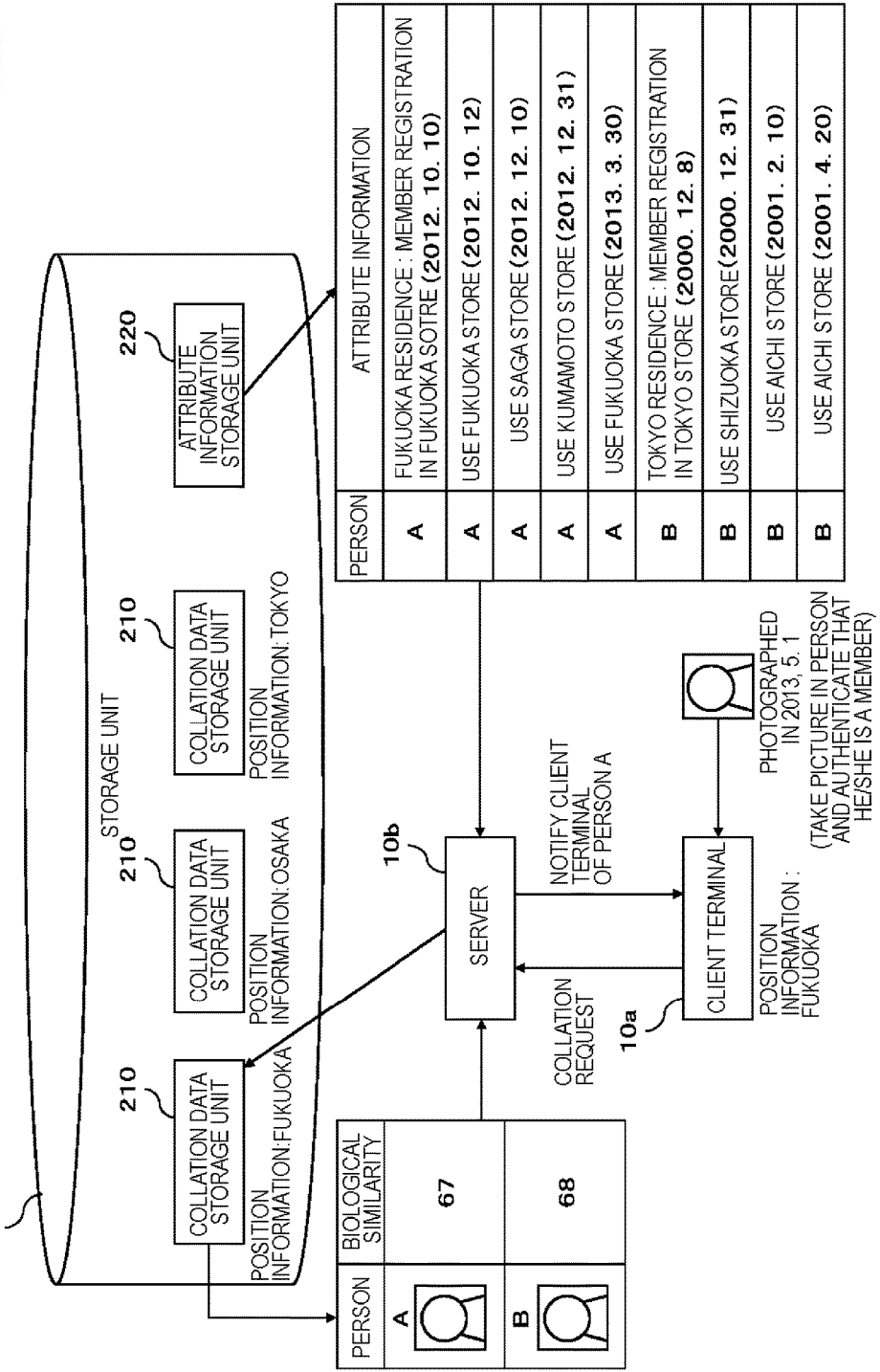
FIG. 12 is a diagram illustrating a configuration example of an authentication system according to Example 2.

In the present example, a service for authenticating a member at a certain store will be described. FIG. 12 is a diagram illustrating a configuration example of an authentication system 1000 according to Example 2.

In the present example, the client terminal 10*a* is, for example, a terminal or the like which is used by a store assistant. A region indicating biological features such as a person's face is cut out from an image captured by the client terminal 10*a*, and is acquired as first biological data. In addition, a position, time or the like at which this image is captured is acquired as attribute information. The client terminal 10*a* transmits a collation request including the first biological data and the attribute information which are acquired, to the server 10*b*. In the example of FIG. 12, since the client terminal 10*a* acquires the first biological data within Fukuoka Prefecture, "position information: Fukuoka" is acquired as the attribute information.

The server 10*b* specifies second biological data corresponding to the first biological data, using the first biological data and the attribute information which are received. In the example of FIG. 12, since the attribute information received from the client terminal 10*a* includes the "position information: Fukuoka", the server 10*b* selects a collation data storage unit 210 corresponding to the "position information: Fukuoka", as the collation data storage unit 210 used during collation. In addition, in the example of FIG. 12, pieces of second biological data of a person A and a person B are stored in the collation data storage unit 210 corresponding to the "position information: Fukuoka". Biological similarities of each piece of the second biological data and the first biological data received from the client terminal 10a are "67" and "68", respectively. Here, the server 10b specifies the second biological data corresponding to the person A as second biological data corresponding to the first biological data in this time, in consideration of an average distance between position information included in a collation request and position information included in use information, a distance between the position information included in the collation request and a member registration place, age estimated from the first biological data, age estimated from the second biological data, and the like. The server 10b notifies the client terminal 10a that a person corresponding to the first biological data is the person A. In this manner, a member at a store can be specified just by the biological feature data. That is, in the present example, the biological feature data is used similarly to a point card of the related art. In this case, since the issue or presentation of the point card is not required, management and operations are facilitated. In addition, coupon information or the like of a specified member can also be presented together.

In addition, this can also be used in an application of guidance to a campaign site. In this case, for example, a person's face portion published in a magazine, a poster or the like is captured using the client terminal 10a, and guidance to campaign sites different from each other for each area can be performed on the basis of position information acquired together with the face image data. In this manner, the biological feature data can also be used similarly to the QR Code (Registered Trademark). Further, in this manner, cost reduction effect can be expected without separately creating information such as the QR Code (Registered Trademark).

Example 3

Figure 13:
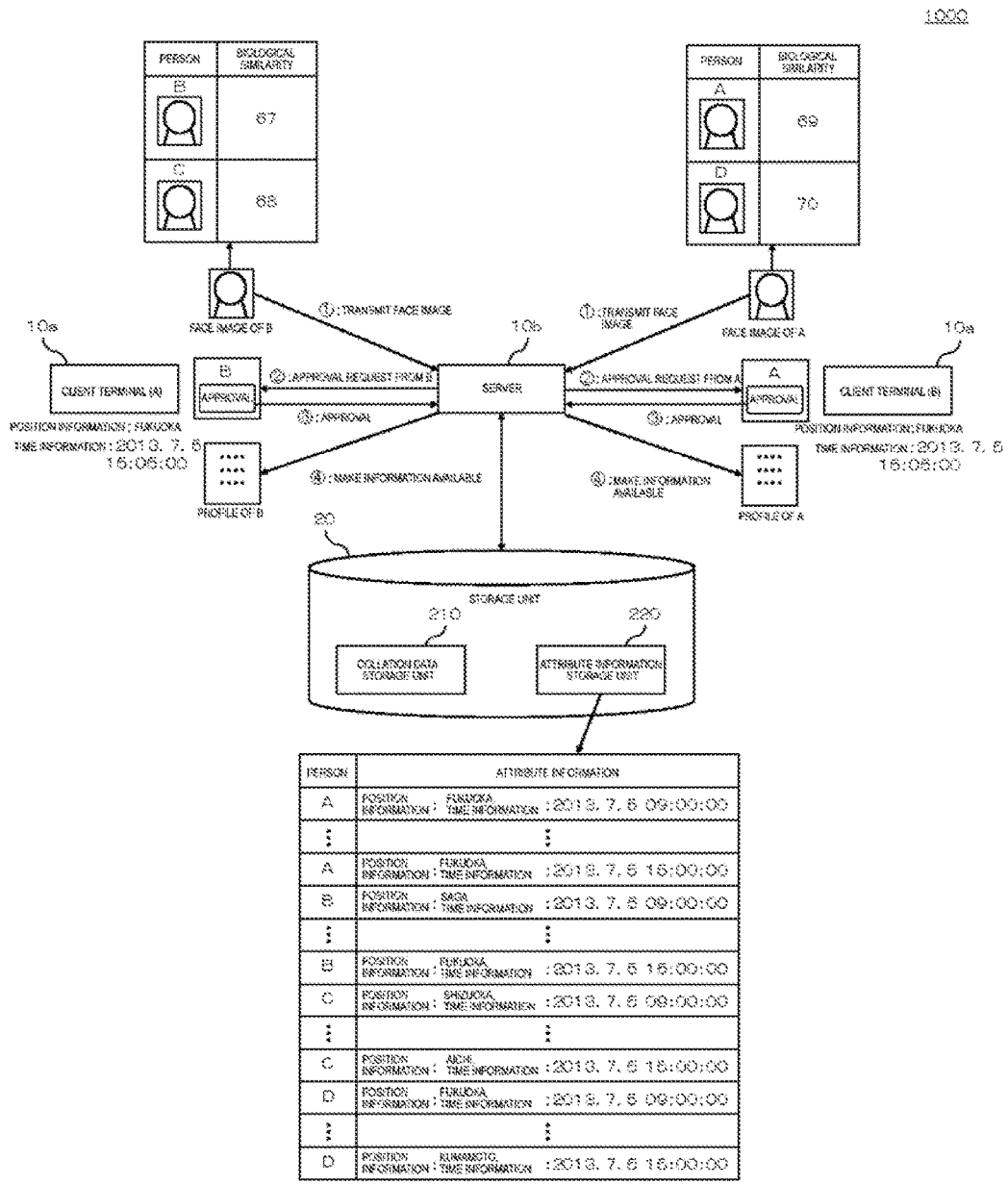
FIG. 13 is a diagram illustrating a configuration example of an authentication system according to Example 3.

In the present example, an information exchange service will be described. FIG. 13 is a diagram illustrating a configuration example of an authentication system 1000 according to Example 3.

In the present example, it is premised that position information and time information of each client terminal 10a are acquired at a predetermined interval, and are accumulated in the attribute information storage unit 220. In the present example, a process is executed as follows. First, a person A and a person B acquire mutual face images as first biological data, using each client terminal 10a. In this case, the position information and the time information are acquired as attribute information, together with the first biological data. Here, "position information: Fukuoka" and "time information: 2013.7.5 15:05:00" are acquired as the attribute information. The first biological data and the attribute information are transmitted from each client terminal 10a to the server 10b. The server 10b determines that a person corresponding to the first biological data is the person B, in view of a collation result of the first biological data transmitted from the client terminal 10a of the person A and the attribute information stored in the attribute information storage unit 220. The server 10b transmits an approval request from the person B, to the client terminal 10a of the person A. In addition, the server 10b determines that a person corresponding to the first biological data is the person A, in view of a collation result of the first biological data transmitted from the client terminal 10a of the person B and the attribute information stored in the attribute information storage unit 220. The server 10b transmits an approval request from the person B, to the client terminal 10a of the person B. When an approval operation is performed in each client terminal 10a, the server 10b makes profile information of the person B available to the person A, and makes profile information of the person A available to the person B. In this manner, it is also possible to provide a service for making personal information available to mutual partners.

Example 4

Figure 14:
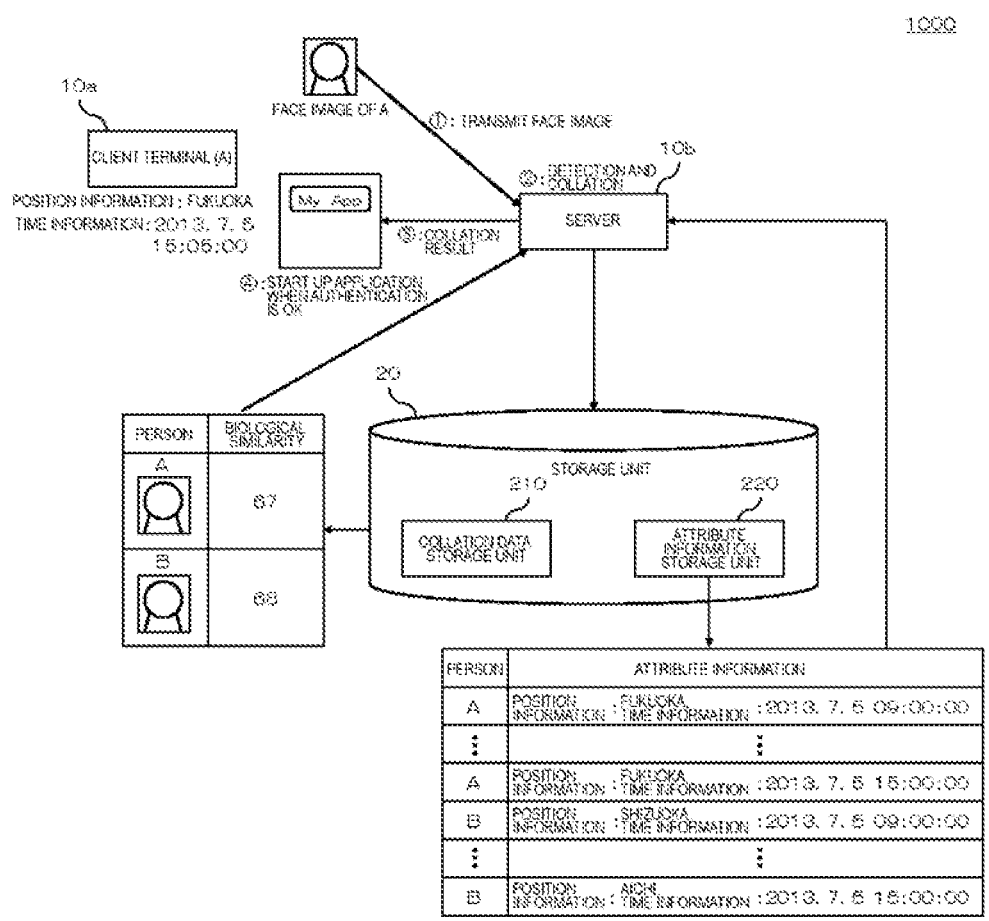
FIG. 14 is a diagram illustrating a configuration example of an authentication system according to Example 4.

In the present example, an authentication service during application startup will be described. FIG. 14 is a diagram illustrating a configuration example of an authentication system 1000 according to Example 4.

In the present example, it is premised that position information and time information of each client terminal 10a are acquired at a predetermined interval, and are accumulated in the attribute information storage unit 220. In the present example, a process is executed as follows. First, a user A acquires his/her face image as first biological data using the client terminal 10a in order to perform authentication during application startup. In this case, the position information and the time information are acquired as attribute information, together with the first biological data. Here, "position information: Fukuoka" and "time information: 2013.7.5 15:05:00" are acquired as the attribute information. The first biological data and the attribute information are transmitted from client terminal 10a to the server 10b. The server 10b determines that a person corresponding to the first biological data is the person A, in view of a collation result of the first biological data transmitted from the client terminal 10a and the attribute information stored in the attribute information storage unit 220. The server 10b refers to a right of access given to the person A, or the like, and performs authentication on whether the person A is an authorized user of the application. In a case of the success of authentication, the application is started up in the client terminal 10a. In this manner, it is also possible to centrally manage access restriction such as restriction of a user for each application.

As described above, although the embodiments and examples of the present invention have been set forth with reference to the accompanying drawings, they are merely illustrative of the present invention, and various configurations other than those stated above can be adopted.

In addition, in the flow diagrams and the sequence diagrams using the aforementioned description, a plurality of processes are described in order, but the execution order of processes which are executed in each embodiment is not limited to the described order. In each embodiment, the order of processes shown can be changed within a range without causing any problem in terms of contents. In addition, each embodiment described above can be combined in a range consistent with the contents thereof.

Hereinafter, examples of reference forms are appended.
1. An information processing device including:
a first acquisition unit that acquires first biological data which is biological feature data of a collated object and attribute information relating to the first biological data;
a collation unit that refers to a collation data storage unit that stores a plurality of pieces of second biological data which are biological feature data for use in collating the first biological data, and collates the first biological data with each piece of the second biological data;
a second acquisition unit that acquires attribute information for each piece of the second biological data from an attribute information storage unit that stores attribute information associated with each piece of the second biological data; and a specification unit that compares the attribute information acquired together with the first biological data with the attribute information associated with each piece of the second biological data, and specifies at least one of the pieces of second biological data corresponding to the first biological data, on the basis of a result of the comparison and a result of the collation.

2. The information processing device according to 1, wherein the specification unit specifies at least one of the pieces of second biological data corresponding to the first biological data by weighting the result of the collation using the result of the comparison.

3. The information processing device according to 1 or 2, wherein when the plurality of pieces of second biological data corresponding to the first biological data are specified, the specification unit further determines priorities of the specified pieces of second biological data, on the basis of the result of the comparison and the result of the collation.

4. The information processing device according to any one of 1 to 3, further including an accumulation unit that accumulates the attribute information acquired together with the first biological data, as attribute information to be associated with the specified pieces of second biological data, in the attribute information storage unit.

5. The information processing device according to any one of 1 to 4, wherein a priority is set for each type of the attribute information, and
the specification unit specifies at least one of the pieces of second biological data corresponding to the first biological data, on the basis of a comparison result for each type of the attribute information of the first biological data and the second biological data, a priority for each type of the attribute information, and the result of the collation.

6. The information processing device according to any one of 1 to 5, wherein a plurality of the collation data storage units are present in accordance with a section of the attribute information, and
the device further includes a selection unit that selects the collation data storage unit to be referred to during the collation from the plurality of collation data storage units, on the basis of the attribute information acquired together with the first biological data.

7. The information processing device according to 6, further including an arrangement unit that moves or copies the second biological data stored in one of the collation data storage units, to another collation data storage unit corresponding to attribute information associated with the second biological data.

8. An authentication system including:
an information processing device; and
a server,
wherein the information processing device includes
a first acquisition unit that acquires first biological data which is biological feature data of a collated object and attribute information relating to the first biological data, and
a transmission unit that transmits the first feature data and the attribute information, and
the server includes
a receiving unit that receives the first feature data and the attribute information,
a collation unit that refers to a collation data storage unit that stores a plurality of pieces of second biological data which are biological feature data for use in collating the first biological data, and collates the first biological data with each piece of the second biological data,
a second acquisition unit that acquires attribute information for each piece of the second biological data from an attribute information storage unit that stores attribute information associated with each piece of the second biological data, and
a specification unit that compares the attribute information acquired together with the first biological data with the attribute information associated with each piece of the second biological data, and specifies at least one of the pieces of second biological data corresponding to the first biological data, on the basis of a result of the comparison and a result of the collation.

9. The authentication system according to 8, wherein the specification unit specifies at least one of the pieces of second biological data corresponding to the first biological data by weighting the result of the collation using the result of the comparison.

10. The authentication system according to 8 or 9, wherein when the plurality of pieces of second biological data corresponding to the first biological data are specified, the specification unit further determines priorities of the specified pieces of second biological data, on the basis of the result of the comparison and the result of the collation.

11. The authentication system according to any one of 8 to 10, further including an accumulation unit that accumulates the attribute information acquired together with the first biological data, as attribute information to be associated with the specified pieces of second biological data, in the attribute information storage unit.

12. The authentication system according to any one of 8 to 11, wherein a priority is set for each type of the attribute information, and
the specification unit specifies at least one of the pieces of second biological data corresponding to the first biological data, on the basis of a comparison result for each type of the attribute information of the first biological data and the second biological data, a priority for each type of the attribute information, and the result of the collation.

13. The authentication system according to any one of 8 to 12, wherein a plurality of the collation data storage units are present in accordance with a section of the attribute information, and
the device further includes a selection unit that selects the collation data storage unit to be referred to during the collation from the plurality of collation data storage units, on the basis of the attribute information acquired together with the first biological data.

14. The authentication system according to 13, further including an arrangement unit that moves or copies the second biological data stored in one of the collation data storage units, to another collation data storage unit corresponding to attribute information associated with the second biological data.

15. An authentication method including causing a computer to:
acquire first biological data which is biological feature data of a collation object and attribute information relating to the first biological data;
refer to a collation data storage unit that stores a plurality of pieces of second biological data which are biological feature data for use in collated the first biological data, and collate the first biological data with each piece of the second biological data;
acquire attribute information for each piece of the second biological data from an attribute information storage unit that stores attribute information associated with each piece of the second biological data; and
compare the attribute information acquired together with the first biological data with the attribute information associated with each piece of the second biological data, and specify at least one of the pieces of second biological data corresponding to the first biological data, on the basis of a result of the comparison and a result of the collation.

16. The authentication method according to 15, further including causing the computer to specify at least one of the pieces of second biological data corresponding to the first biological data by weighting the result of the collation using the result of the comparison.

17. The authentication method according to 15 or 16, further including causing the computer to, when a plurality of pieces of the second biological data corresponding to the first biological data are specified, determine priorities of the specified pieces of second biological data on the basis of the result of the comparison and the result of the collation.

18. The authentication method according to any one of 15 to 17, further including causing the computer to accumulate the attribute information acquired together with the first biological data, as attribute information to be associated with the specified pieces of second biological data, in the attribute information storage unit.

19. The authentication method according to any one of 15 to 18, wherein a priority is set for each type of the attribute information, and the method further includes causing the computer to specify at least one of the pieces of second biological data corresponding to the first biological data, on the basis of a comparison result for each type of the attribute information of the first biological data and the second biological data, a priority for each type of the attribute information, and the result of the collation.

20. The authentication method according to any one of 15 to 19, wherein a plurality of the collation data storage units are present in accordance with a section of the attribute information, and
the method further includes causing the computer to select the collation data storage unit to be referred to during the collation from the plurality of collation data storage units, on the basis of the attribute information acquired together with the first biological data.

21. The authentication method according to 20, further including causing the computer to move or copy the second biological data stored in one of the collation data storage units, to another collation data storage unit corresponding to attribute information associated with the second biological data.

22. A program causing a computer to function as:
a first acquisition unit that acquires first biological data which is biological feature data of a collated object and attribute information relating to the first biological data;
a collation unit that refers to a collation data storage unit that stores a plurality of pieces of second biological data which are biological feature data for use in collating the first biological data, and collates the first biological data with each piece of the second biological data;
a second acquisition unit that acquires attribute information for each piece of the second biological data from an attribute information storage unit that stores attribute information associated with each piece of the second biological data; and
a specification unit that compares the attribute information acquired together with the first biological data with the attribute information associated with each piece of the second biological data, and specifies at least one of the pieces of second biological data corresponding to the first biological data, on the basis of a result of the comparison and a result of the collation.

23. The program according to 22, wherein the specification unit specifies at least one of the pieces of second biological data corresponding to the first biological data by weighting the result of the collation using the result of the comparison.

24. The program according to 22 or 23, wherein when the plurality of pieces of second biological data corresponding to the first biological data are specified, the specification unit further determines priorities of the specified pieces of second biological data, on the basis of the result of the comparison and the result of the collation.

25. The program according to any one of 22 to 24, causing the computer to further function as an accumulation unit that accumulates the attribute information acquired together with the first biological data, as attribute information to be associated with the specified pieces of second biological data, in the attribute information storage unit.

26. The program according to any one of 22 to 25, wherein a priority is set for each type of the attribute information, and the specification unit specifies at least one of the pieces of second biological data corresponding to the first biological data, on the basis of a comparison result for each type of the attribute information of the first biological data and the second biological data, a priority for each type of the attribute information, and the result of the collation.

27. The program according to any one of 22 to 26, wherein a plurality of the collation data storage units are present in accordance with a section of the attribute information, and the program causes the computer to further function as a selection unit that selects the collation data storage unit to be referred to during the collation from the plurality of collation data storage units, on the basis of the attribute information acquired together with the first biological data.

28. The program according to 27, causing the computer to further function as an arrangement unit that moves or copies the second biological data stored in one of the collation data storage units, to another collation data storage unit corresponding to attribute information associated with the second biological data.

What is claimed is:
1. An information processing device including:
a non-transitory computer-readable data storage medium storing code; and
a processor executing the code to
acquire first biological data which is biological feature data of an object,
acquire first attribute information indicating an attribute of the first biological data,
collate the first biological data with a plurality of second biological data which is identified biological feature data stored in a storage, the storage storing second biological data,
compare the first attribute information with second attribute information stored in the storage in association with the second biological data, the second attribute information indicating an attribute of the second biological data,
specify at least one of the plurality of second biological data corresponding to the first biological data on the basis of both similarity of biological data and similarity of attributes, the similarity of attributes resulting from comparing the first attribute with the attributes of the second biological data, the similarity of biological data resulting from collating the first biological data and the second biological data, and
biometrically authenticate a user from the second biological data and the first biological data,
wherein each of the first and second attribute information includes at least one of position information and time information, wherein the processor executes the code to further accumulate the first attribute information as new second attribute information to be associated with the second biological data in the storage, wherein execution of the code improves efficiency in biometric authentication in a client-server context, in that the first biological data is transmitted from a client, and the second biological data is selected by a server and transmitted back to the client to perform the biometric authentication.

2. The information processing device according to claim 1, wherein the processor is further configured to specify at least one of the plurality of second biological data corresponding to the first biological data by weighting the similarity of biological data using the similarity of the attributes.

3. The information processing device according to claim 1, wherein when the plurality of second biological data corresponding to the first biological data are specified, the processor is further configured to determine priorities of the second biological data, on the basis of the similarity of biological data and the similarity of the attributes.

4. The information processing device according to claim 1, wherein a priority is set for a type of each attribute, and
the processor is further configured to specify at least one of the plurality of second biological data corresponding to the first biological data, on the basis of similarity for the type of the first attribute information and the second attribute information, the priority for the type of each attribute, and the similarity of biological data.

5. The information processing device according to claim 1, wherein a plurality of the storages are present in accordance with a section of an attribute, and
the processor is further configured to select at least one of the storages to be referred to during the collation, on the basis of the first attribute information.

6. The information processing device according to claim 5, the processor is further configured to move or copy the second biological data stored in one of the storages, to another storage corresponding to the second attribute information associated with the second biological data.

7. The information processing device according to claim 1, the first and second attribute information includes at least one of information on location, information on time, information on age, and information on sex.

8. An authentication system comprising:
an information processing device; and
a server,
wherein the information processing device includes a first non-transitory medium storing code and a first processor, which executes the code to
acquire first biological data which is biological feature data of an object, and
acquire first attribute information indicating an attribute of the first biological data,
transmit the first biological data and the first attribute information, and
the server includes a second non-transitory medium storing code and a second processor, which executes the code to
receive the first biological data and the first attribute information,
collate the first biological data with a plurality of second biological data which is identified biological feature data stored in a storage, the storage storing second biological data,
compare the first attribute information with second attribute information stored in the storage in association with the second biological data, the second attribute information indicating an attribute of the second biological data,
specify at least one of the plurality of second biological data corresponding to the first biological data, on the basis of both similarity of biological data and similarity of attributes, the similarity of attributes resulting from comparing the first attribute with the attributes of the second biological data, the similarity of biological data resulting from collating the first biological data and the second biological data, and
biometrically authenticate a user from the second biological data and the first biological data,
wherein each of the first and second attribute information includes at least one of position information and time information,
and wherein the first processor executes the code to further accumulate the first attribute information as new second attribute information to be associated with the second biological data in the storage,
wherein execution of the code improves efficiency in biometric authentication in a client-server context, in that the first biological data is transmitted from a client that is the information processing device, and the second biological data is selected by the server and transmitted back to the client to perform the biometric authentication.

9. The authentication system according to claim 8, the first and second attribute information includes at least one of information on location, information on time, information on age, and information on sex.

10. An authentication method comprising causing a computer executing code to:
acquire first biological data which is biological feature data of an object;
acquire first attribute information indicating an attribute of the first biological data,
collate the first biological data with a plurality of second biological data which is identified biological feature data stored in a storage, the storage storing second biological data;
compare the first attribute information with second attribute information stored in the storage in association with the second biological data, the second attribute information indicating an attribute of the second biological data,
specify at least one of the plurality of second biological data corresponding to the first biological data, on the basis of both similarity of biological data and similarity of attributes, the similarity of attributes resulting from comparing the first attribute with the attributes of the second biological data, the similarity of biological data resulting from collating the first biological data and the second biological data, and
biometrically authenticate a user from the second biological data and the first biological data,
wherein each of the first and second attribute information includes at least one of position information and time information,
and wherein the method further causes the computer to accumulate the first attribute information, as new second attribute information associated with the specified pieces of second biological data, in the storage,
wherein execution of the code improves efficiency in biometric authentication in a client-server context, in that the first biological data is transmitted from a client that is the computer, and the second biological data is selected by a server and transmitted back to the client to perform the biometric authentication.

11. The authentication method according to claim 10, further comprising causing the computer to specify at least one of the plurality of second biological data corresponding to the first biological data by weighting the similarity of biological data using the similarity of the attributes.

12. The authentication method according to claim 10, further comprising causing the computer to, when a plurality of the second biological data corresponding to the first biological data are specified, determine priorities of the specified pieces of second biological data on the basis of the similarity of biological data and the similarity of the attributes.

13. The authentication method according to claim 10, wherein a priority is set for a type of each attribute, and
the method further comprises causing the computer to specify at least one of the plurality of second biological data corresponding to the first biological data, on the basis of similarity for the type of the first attribute information and the second attribute information, the priority for the type of each attribute, and the similarity of biological data.

14. The authentication method according to claim 10, wherein a plurality of the storages are present in accordance with a section of an attribute, and
the method further comprises causing the computer to select at least one of the storages to be referred to during the collation, on the basis of the first attribute information.

15. The authentication method according to claim 14, further comprising causing the computer to move or copy the second biological data stored in one of the storages, to another storage corresponding to the second attribute information associated with the second biological data.

16. The authentication method according to claim 10, the first and second attribute information includes at least one of information on location, information on time, information on age, and information on sex.

17. A non-transitory computer readable medium storing code causing a computer to perform a method comprising:

acquiring first biological data which is biological feature data of an object;
acquiring first attribute information indicating an attribute of the first biological data;
collating the first biological data with a plurality of second biological data which is identified biological feature data stored in a storage, the storage storing second biological data;
comparing the first attribute information with second attribute information stored in the storage in association with the second biological data, the second attribute information indicating an attribute of the second biological data,
specifying at least one of the plurality of second biological data corresponding to the first biological data, on the basis of both similarity of biological data and similarity of attributes, the similarity of attributes resulting from comparing the first attribute with the attributes of the second biological data, the similarity of biological data resulting from collating the first biological data and the second biological data, and
biometrically authenticate a user from the second biological data and the first biological data,
wherein each of the first and second attribute information includes at least one of position information and time information,
wherein the method further comprises accumulating the first attribute information, as new second attribute information associated with the specified pieces of second biological data, in the storage,
wherein execution of the code improves efficiency in biometric authentication in a client-server context, in that the first biological data is transmitted from a client that is the computer, and the second biological data is selected by a server and transmitted back to the client to perform the biometric authentication.

18. The non-transitory computer readable medium according to claim 17, the first and second attribute information includes at least one of information on location, information on time, information on age, and information on sex.

* * * * *